United States Patent
Smutko et al.

(10) Patent No.: US 11,562,311 B2
(45) Date of Patent: Jan. 24, 2023

(54) ROBOTIC PROCESS AUTOMATION FOR SIGNIFICANT SEQUENCES OF DESKTOP EVENTS

(71) Applicant: NICE LTD., Ra'anana (IL)

(72) Inventors: Ariel Smutko, Rehovot (IL); Aviv Yehezkel, Ramat-Gan (IL); Eran Roseberg, Hogla (IL); Yaron Moshe Bialy, Madrid (ES)

(73) Assignee: NICE LTD., Ra'anana (IL)

( * ) Notice: Subject to any disclaimer, the term of this patent is extended or adjusted under 35 U.S.C. 154(b) by 1052 days.

(21) Appl. No.: 16/243,743

(22) Filed: Jan. 9, 2019

(65) Prior Publication Data

US 2020/0219033 A1    Jul. 9, 2020

(51) Int. Cl.
*G06Q 10/06*    (2012.01)
*G06N 20/00*    (2019.01)
*G06F 9/445*    (2018.01)
*G06F 9/54*    (2006.01)
*G06N 5/04*    (2006.01)

(52) U.S. Cl.
CPC ..... *G06Q 10/06375* (2013.01); *G06F 9/4451* (2013.01); *G06F 9/542* (2013.01); *G06N 5/048* (2013.01); *G06N 20/00* (2019.01)

(58) Field of Classification Search
CPC .. G06Q 10/06375; G06N 20/00; G06N 5/048; G06F 9/4451; G06F 9/542
See application file for complete search history.

(56) References Cited

U.S. PATENT DOCUMENTS

| 2016/0219086 | A9* | 7/2016 | Shukla | H04L 67/10 |
| 2016/0350673 | A1* | 12/2016 | Kumar | G06Q 10/06313 |
| 2018/0113781 | A1* | 4/2018 | Kim | G06F 11/3438 |
| 2020/0068031 | A1* | 2/2020 | Kursun | H04W 24/02 |

OTHER PUBLICATIONS

R. Agrawal, et al.; Mining Sequential Patterns; ICDE '95 Proceedings of the Eleventh International Conference on Data Engineering; Mar. 6-10, 1995; pp. 3-14 (https://dl.acm.org/citation.cfm?id=655281 &preflayout=flat).

J. Pei, et al.; Mining Sequential Patterns by Pattern-Growth: The Prefixspan Approach; IEEE Transactions on Knowledge and Data Engineering, vol. 16, No. 10, Oct. 2004; pp. 1-17.

(Continued)

*Primary Examiner* — S. Sough
*Assistant Examiner* — Kimberly L Jordan
(74) *Attorney, Agent, or Firm* — Haynes and Boone, LLP (57) ABSTRACT

A system is provided for an artificial intelligence engine adapted to identify robotic process automation' opportunities based on return on investment (ROI) potential for automation. The system includes a processor and a computer readable medium configured to perform operations comprising receiving an event log of a plurality of user actions, splitting the plurality of user actions into a plurality of user action sentences, determining a sequence of user actions in the plurality of user action sentences based on a recurrence for the sequence in the plurality of user action sentences, determining a score for the sequence based on a time duration in which the user completes the sequence and based on types of the plurality of user actions in the sequence, and filtering the sequence with a plurality of other sequences.

14 Claims, 6 Drawing Sheets

(56) References Cited

OTHER PUBLICATIONS

D. Saputra, et al.; Mining Sequential Patterns Using I-Prefixspan; Proceedings of World Academy of Science, Engineering and Technology, vol. 26, Dec. 2007, ISSN 1307-6884, pp. 499-504.

Y. Xu, et al.; Analysis of Web Access Sequence Based on the Improved Prefixspan Algorithm; International Industrial Informatics and Computer Engineering Conference (IIICEC 2015), Atlantis Press; pp. 788-791.

Pegasystems Inc.; https://www1.pega.com/products/pega-platform/robotic-automation; accessed Jan. 9, 2019.

B. Dalager, et al.; Changing the Future With Robotics; 44 pages; Pegaworld 2016.

G. Arora, et al.; The Emerging World of Humans & Intelligent Robotics: Working Together to Build Smarter Enterprises; 29 pages; Pegaworld 2016; Pegasystems Inc.

Pega Academy; Pega Robotic Automation Architect Essentials; 1 page; Nov. 2016; Pegasystems Inc.

Pega and Marketforce; The Future of Work; 24 pages; 2017.

A Pega Datasheet (Pegasystems, Inc.); Pega Robotic Process Automation; 2 pages; 2018 Pegasystems Inc.

S. Merritt; Building and Scaling Robots that Deliver Impact: The Leap From RPA to Digital Process Automation; 13 pages; 2018 Pegasystems Inc.

Pega Infinity; Pega 101: Connecting Digital Customer Engagement to the Digital Process Automation that Makes it Happen; 53 pages; 2018 Pegasystems Inc.

Pega Platform; Pega Robotic Automation—Using the Automation Recording Feature 8.0; Jun. 21, 2018; 16 pages; Pegasystems Inc., Cambridge, MA.

Pega Platform; Pega Robotic Automation—Using Data Components 8.0; Jun. 21, 2018; 30 pages; Pegasystems Inc., Cambridge, MA.

Pega Platform; Pega Robotic Automation Studio—Creating UI Connectors 8.0 and 8.0 SP1; Jul. 30, 2018; 30 pages; Pegasystems Inc., Cambridge, MA.

Pega Platform; Pega Robotic Automation Runtime—Installation Instructions 8.0; Aug. 21, 2018; 24 pages; Pegasystems Inc., Cambridge, MA.

Kryon Systems; https://www.krvonsystems.com/process-discovery/; accessed Jan. 23, 2019.

Pega; Leveraging Robots for the Customer Journey; undated; 27 pages.

* cited by examiner

For example:
```
"type":"Click",  ← 502
"name":"LeftClick"  ← 504
"actionTime":"2018-04-14T00:56:17.0592647+05:30"  ← 506
"position": { "X":121, "Y":238 }  ← 508
"activeWindow": {  ← 510
    "processName":"iexplore", "title":"ABCD1234567 | ServicePlease - Internet
    Explorer", "height":603, "width":1366, "top":121, "left":0}
"actionComponent": {  ← 512
    "Name":"All applicationsFavoritesYour history(tab)", "ControlType":"tab item",
    "Id":"","ClassName":""}
```

542 | 'Static' template: ← 540
Hi XXXX, Please approve access to the following BINA Subject Areas (SA): User: XXXXXXX Title: XXXXXX Reporting to: XXXXXXXX Reason for access: XXXXX Descriptive BINA CccccccSccc module information. (E.g. Country, Region, Top Division, etc.)

542 | 'Dynamic' template: ← 544
Hi John, Please approve access to the following BINA Subject Areas (SA): User: George Title: Manager Reporting to: Jennifer Reason for access: New Employee

FIG. 5C

ROBOTIC PROCESS AUTOMATION FOR SIGNIFICANT SEQUENCES OF DESKTOP EVENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to robotic process automation, and more specifically to a system and method for identifying significant sequences of desktop events that have the highest return on investment (ROI) for robotic automation opportunities.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized (or be conventional or well-known) in the prior art. The subject matter in the background section merely represents different approaches, which in and of themselves may also be inventions.

A computing device, such as a client device, may be used to enter input and perform various computing functions through mouse clicks and movements, keyboard and/or touch inputs, and other types of user input. As such, the user may repeatedly perform actions, which causes increased input and data processing by a computing device and leads to negative user experiences with data processing and software. Often various types of business processes that may be performed with a client device may require multiple different types of inputs and may be repeated with different input data, such as names, businesses, and other information. Businesses and other entities may wish to provide robotic automation of these processes and sequences of inputs so that users are not required to repeatedly perform such inputs. Robotic automation of these repeated processes provides savings in time, inputs, and processing resources. However, discovery and analysis of these robotic automation opportunities is presently done manually, and determination of ROI for automation opportunities may be difficult to determine and justify. This causes significant business process flows that can be automated to be missed. Additionally, this introduces bias and is time consuming and costly.

BRIEF DESCRIPTION OF THE DRAWINGS

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

For a desktop events conducted by a user, methods, data structures, and systems are provided for identifying and automating significant sequences of these desktop events based on ROI potential for automation. A database system stores tables and data structures of user desktop events that is accessible by an automation finder engine. The events may be generated, for example, by users or administrators (e.g., agents of an organization) of client systems or devices based on input and processing requests to the client devices, such as input and data while performing operations on the client devices.

The automation finder engine may process the desktop events and other user actions to split the user actions into sentences, or a string of user actions that acts as an entire input to perform some business process. These sentences of user actions act as a combination of several actions that express a particular business functionality. Using these sentences, repetitive sequences may be identified, which may be those sequences that have corresponding user actions that are consecutive and/or within the same time-frame and are repeated within a stream of user actions. The sequences may be filtered to identify the best ones of those sequences that have the highest ROI. Once significant ones are identified and named, those may be used to build one or more templates that permit entry of dynamic text when form filling or otherwise executing a business process.

The embodiments described herein provide methods, computer program products, and computer database systems for robotic process automation for significant sequences of desktop events using machine learning techniques. An automation finder system provides users with access to templates and other robotic automation processes based on identification of significant sequences for automation. For example, the online system may provide a portal that includes templates and other robotic automation processes. As part of providing the services to users, the online system stores these robotic automation processes and provides the processes for access through an automation finder portal. The robotic automation processes may be accessible, executable, and/or downloadable using the portal.

According to some embodiments, in a automation finder system accessible by a plurality of separate and distinct organizations, a machine learning model is provided for identifying, predicting, and automating sequences of user actions and desktop events based on ROI potential for automating such sequences, taking into account the specificities of each sequence and the sequences together, thereby enhancing the experience of users during use of client devices, reducing repeated input, and increasing processing speed and availability.

Example Environment

Figure 1:
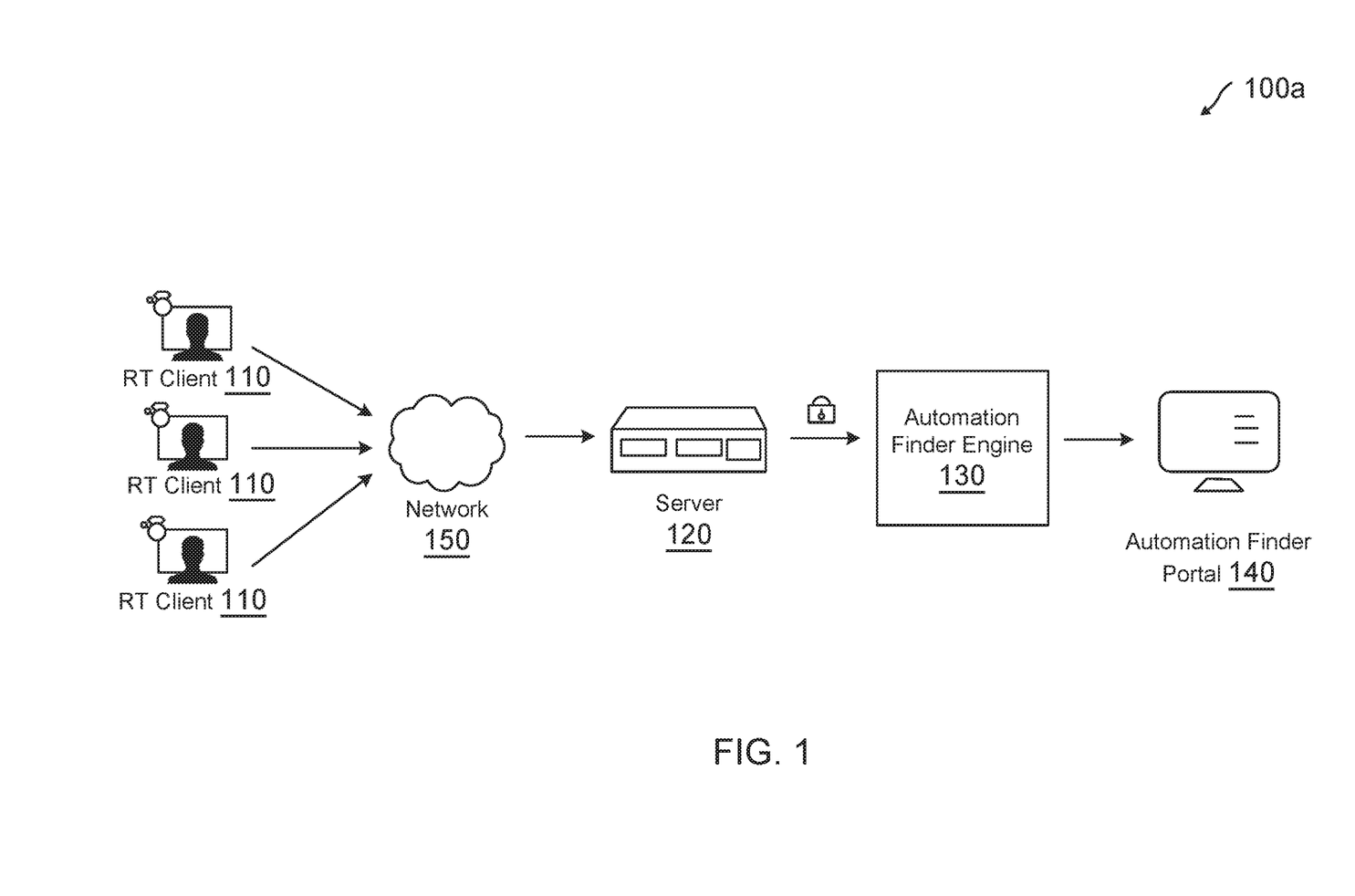
FIG. 1 illustrates a block diagram of an example environment wherein systems and methods for business process automation may be implemented according to some embodiments.

The system and methods of the present disclosure can include, incorporate, or operate in conjunction with or in the environment of an automation finder engine, database, and portal, which may include cloud-based computing architecture. FIG. 1 is a block diagram of a networked environment 100 suitable for implementing the processes described herein, according to an embodiment. As shown, environment 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided, by such devices and/or servers may be combined or separated for a given embodiment and may be performed by a greater number or fewer number of devices and/or servers. For example, cloud-based architectures have been developed to improve collaboration, integration, and community-based cooperation between users without sacrificing data security. One or more devices and/or servers may be operated and/or maintained by the same or different entities.

FIG. 1 illustrates a block diagram of an example environment 100 according to some embodiments. Environment 100 may include clients 110, server 120, automation finder server 130, and automation finder portal 140 in communication over a network 150 for identifying and automating significant sequences of desktop events based on ROI potential. In other embodiments, environment 100 may not have all of the components listed and/or may have other elements instead of, or in addition to, those listed above. In some embodiments, the environment 100 is an environment in which an automation finder service exists. A client 110 may be any machine or system that is used by a user to provide user inputs and actions to perform desktop events, as well as access an automation finder system. For example, any of clients 110 can be a handheld computing device, a mobile phone, a laptop computer, a notepad computer, a work station, and/or a network of computing devices. As illustrated in FIG. 1 (and in more detail in FIG. 2) clients 110 might interact via a network 150 with an automation finder service, which is automation finder server 130 and automation finder portal 140.

Clients 110 may be utilized in order to collect user desktop events and provide event logs and processing history associated with the desktop events. A desktop event may correspond to any desktop activity of a user, for example, a text copy through mouse clicks and/or keyboard commands, a text paste, a left or right mouse click, a selection of a tab command, input of text data, or other input and activity of the user. The desktop event may also be associated with particular user actions, which is the execution of the particular desktop event (e.g., the input) within a certain application, at a certain time, and/or according to another parameter (e.g., interface location, elements, etc.). These user actions may be joined into discreet sequences of actions, which define a particular execution of a process by a user. For example, a concatenation of several actions, which may or may not be consecutive but may be joined by a temporal similarity, may correspond to a complete business flow executed by a user, such as a process. These processes may therefore be identifiable and utilized for automation based on significant sequences of actions, or processes, that have a highest or best ROI for robotic automation.

The users of clients 110 may differ in their respective capacities, and the capacity of a particular client 110 might be entirely determined by applications, permissions, and profiles for the current user. For example, where a salesperson is using a particular client 110 to perform desktop events, that user system has the capacities allotted to that salesperson and those desktop events may be associated with a salesperson. However, while an administrator is using that client 110 to perform desktop events, that client 110 has the capacities allotted to that administrator and may perform desktop events associated with an administrator. Thus, different users will have different capabilities and perform different desktop events with regard to automation of desktop events, and corresponding profiles may be provided to server 120 when collecting and automating desktop events.

Each of clients 110 also typically include one or more user interface devices, such as a keyboard, mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the server 120 or other systems or servers. For example, the user interface device can be used to access data and applications hosted by server 120, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

Clients 110 might communicate with server 120 and/or automation finder portal 140 using TCP/IP and, at a higher network level, use other common Internet protocols to communicate, such as hypertext transfer protocol (HTTP or HTTPS for secure versions of HTTP), file transfer protocol (FTP), wireless application protocol (WAP), etc. In an example where HTTP/HTTPS is used, client 110 might include an HTTP/HTTPS client commonly referred to as a "browser" for sending and receiving HTTP//HTTPS messages to and from an HTTP//HTTPS server, such as server 120. Such an HTTP/HTTPS server might be implemented as the sole network interface between server 120 and network 150, but other techniques might be used as well or instead. In some implementations, the interface between server 120 and network 150 includes load sharing functionality. Clients 110 may collect and provide user desktop events and actions and export them to server 120 as JavaScript Object Notation (JSON) or other file format over a secure connection, such as HTTPS.

Network 150 is any network or combination of networks of devices that communicate with one another. For example, network 150 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the Internet. However, it should be understood that the networks that the present embodiments might use are not so limited, although TCP/IP is a frequently implemented protocol.

According to one embodiment, server 120 is configured to provide webpages, forms, applications, data, and media content to clients 110 and/or to receive data from clients 110, including logs of desktop events used for determination of robotic automation opportunities of business processes. As such, server 120 provides security mechanisms to keep data secure. Additionally, the term "server" is meant to include a computer system, including processing hardware and process space(s), and an associated storage system and database application (e.g., object-oriented data base management system (OODBMS) or rational database management system (RDBMS)). It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

In some embodiments, the server 120, shown in FIG. 1, executes automation finder engine 130 and automation finder portal 140. For example, in one embodiment, server 120 includes application servers configured to implement and execute software applications as well as provide related data, code, forms, webpages, and other information associated with automation finder engine 130 and automation finder portal 140, and to store to, and retrieve from, a database system related data, objects, and web page content associated with automation finder engine 130 and automation finder portal 140. For example, server 120 may implement various functions of automation finder engine 130 and automation finder portal 140, and the process space for executing system processes, such as running applications as part of automation finder engine 130 and automation finder portal 140. Additional processes that may execute on server 120 include database indexing processes associated with desktop event logs received from clients 110.

Several elements in the system shown in FIG. 1 include elements that are explained briefly here. For example, each of clients 110 could include a desktop personal computer, workstation, laptop, notepad computer, PDA, cell phone, or any wireless access protocol (WAP) enabled device or any other computing device capable of interfacing directly or indirectly to the Internet or other network connection. Each of clients 110 typically runs an HTTP/HTTPS client, e.g., a browsing program, such as Microsoft's Internet Explorer browser, Netscape's Navigator browser, Opera's browser, or a WAP-enabled browser in the case of a cell phone, notepad computer, PDA or other wireless device, or the like. According to one embodiment, each of clients 110 and all of its components are configurable using applications, such as a browser, including computer code run using a central processing unit such as an Intel Pentium® processor or the like. Similarly, server 120 and all of their components might be operator configurable using application(s) including computer code to run using a central processing unit, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein utilizing one or more computing devices. Computer code for operating and configuring server 120 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

Machine Learning Model

Figure 2:
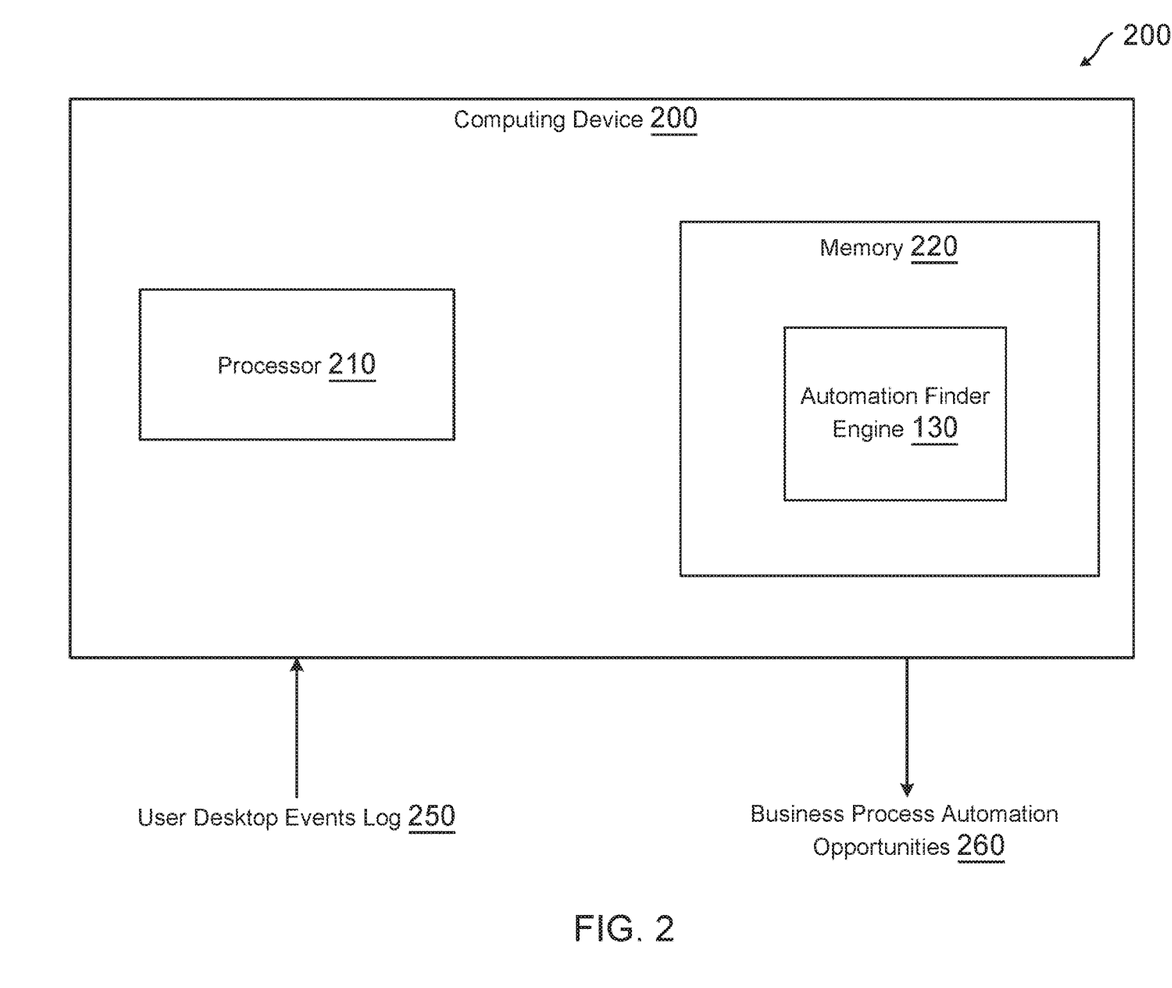
FIG. 2 is a simplified diagram of a computing device according to some embodiments.

In order to provide automation opportunities of business processes, a machine learning model may be generated based on initial input data. FIG. 2 is a simplified diagram of a computing device 200 according to some embodiments. As shown in FIG. 2, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities. In some examples, memory 220 may include non-transitory, tangible, machine readable media that includes executable code that when run by one or more processors (e.g., processor 210) may cause the one or more processors to perform any of the methods described further herein.

As shown, memory 220 includes automation finder engine 130. Automation finder engine 130 is implemented as a machine learning engine and/or neural network used to automatically analyze real-world information with human-like accuracy. In general, machine learning engines receive input information and make inferences and/or predictions using the input over time through a machine learning process, such as a supervised, unsupervised, and/or reinforcement learning model, although other types of learning may be utilized. Thus, a machine learning engine may proceed iteratively over an input corpus of documents or event file logs, such as win-32 logs of desktop events, and make similar inferences from the training examples that a human might make. Automation finder engine 130 may be used to implement and/or emulate any of the machine learning processes described further herein. According to some embodiments, automation finder engine 130 may be trained with one or more encodings or features so that it is able to predict and/or cluster similar desktop events into business processes for automation. This is described in more detail below.

Figure 5A:
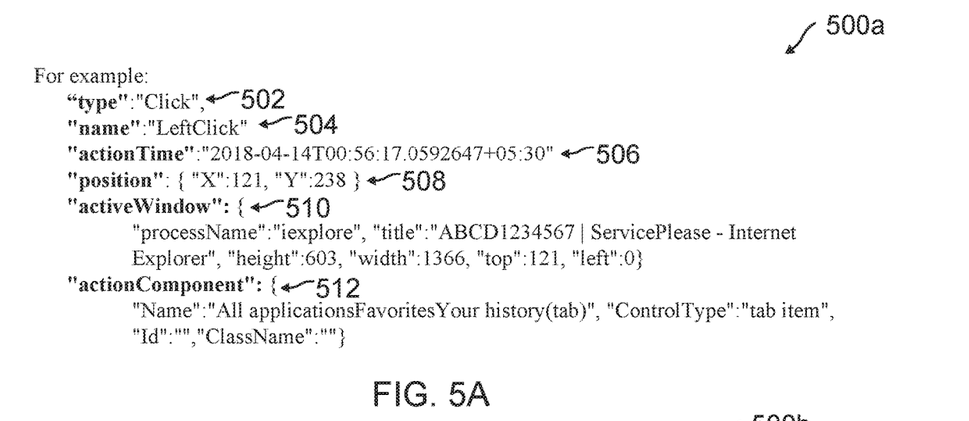
FIGS. 5A-5C are a simplified diagram illustrating types of data processed when identifying business process automation opportunities according to some embodiments.

After training of automation finder engine 130, in some embodiments, the machine learning model implemented by automation finder engine 130 is provided to automate desktop events for users, organizations, and companies executing such events, such as clients 110. Computing device 200 may receive or intake a user event log 250 of desktop events by a user, such as win-32 logs. User event log 250 can be unstructured data in that it can take the form of input fields, text, and actions. In some embodiments, the input sequence is not constrained, restricted, or required to be in a particular form or limited to a particular set of words, phrases, or vocabulary. An example of input according to some embodiments is shown in FIG. 5A. As an example, user event log 250 of training data shows an action executed by a user, at a time, and with an application or computing process. In some embodiments, the same or similar desktop event may be used as part of a business process. The computing device 200 can receive user event log 250 through a user interface with server 120 and/or databases of server 120.

Figure 5B:
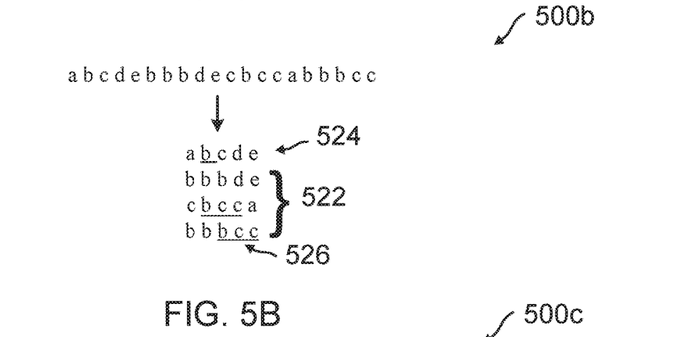
Figure 5C:
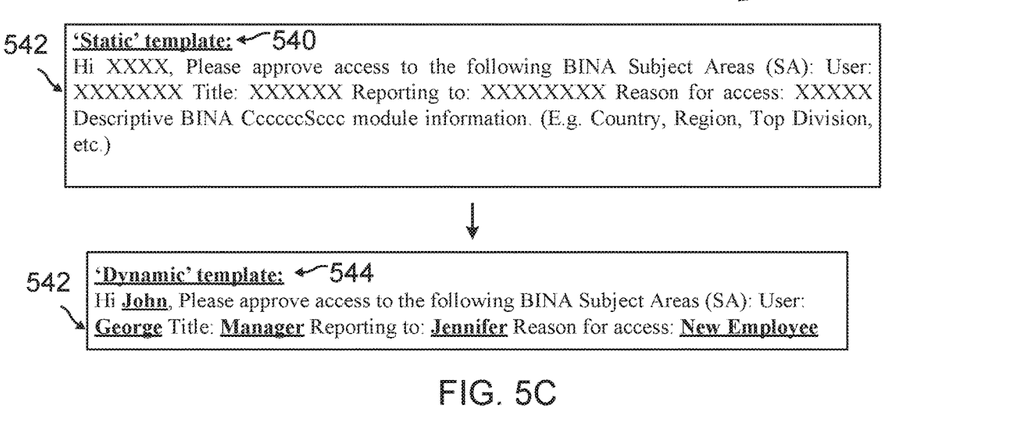

The computing device 200, using the model of automation finder engine 130, generates related business process automation 260 for which an automation of a business process is performed according to a template, taking into account the significance and ROI of the business process. Business processes may be detected based on sequences of desktop events and user actions. An example of determination of a sequence of user actions is shown in FIG. 5B. Thus, for example, for an agent (e.g., a user or an administrator of the system) the computing device 200 may predict that a determined business process from user event log 250 would have a high ROI and is significant, and thus would support the of the business process detected in user event log 250. An example of corresponding template based on business process automation is shown in FIG. 5C, such as a repetitive input of command to clients 110. However, additional types of templates for business processes may also be returned, such as depending on the particular desktop events and user actions, the significance of the business process, and the like. According to some embodiments, the functionality of the computing device 200, including automation finder engine 130, may be implemented or incorporated in a portal that allows identification, searching, use of, and/or downloading of business process automation 260 through automation finder portal 140.

Figure 3:
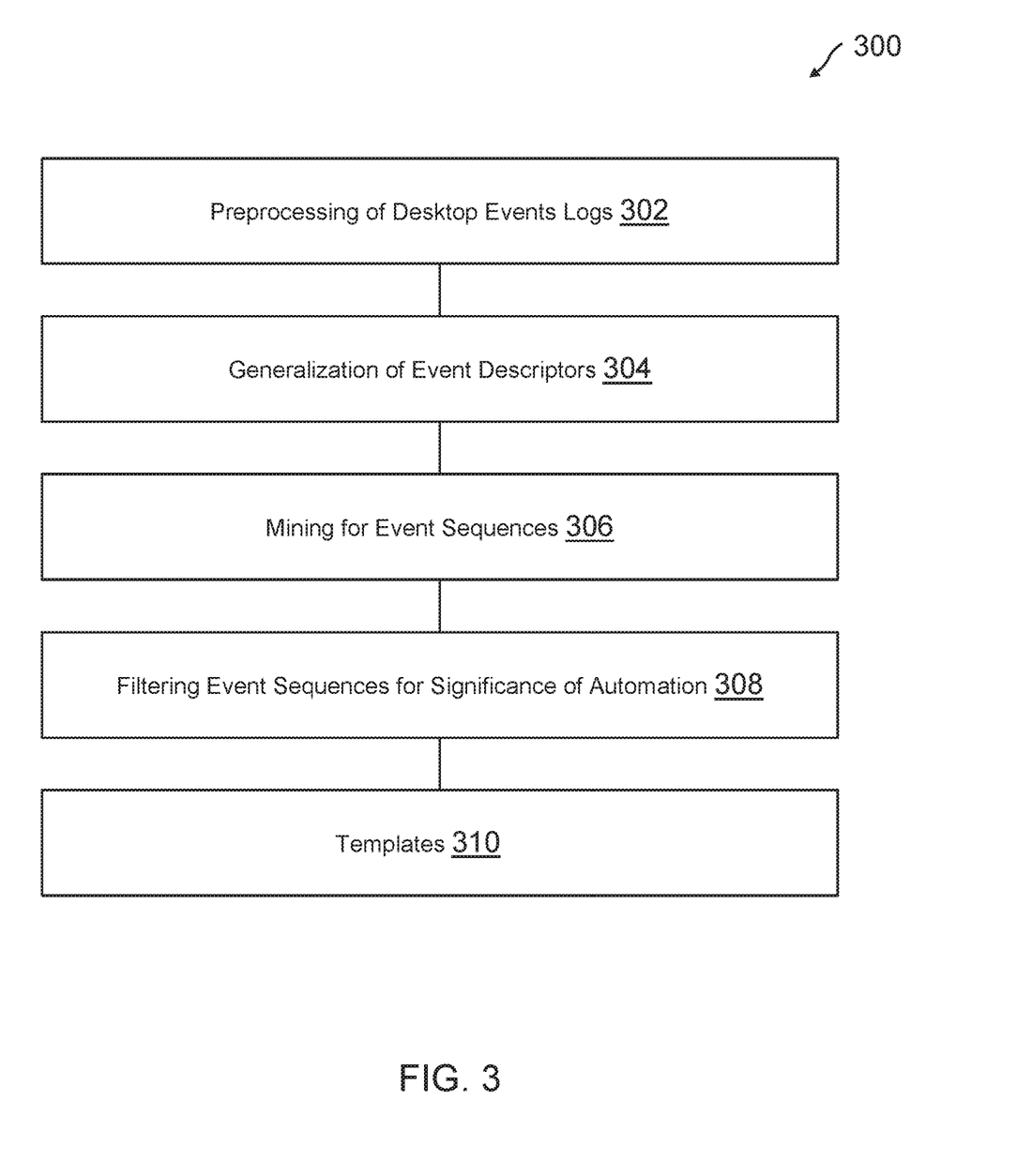
FIG. 3 is a simplified diagram of a method for training and use of a machine learning model for identification of business process automation opportunities according to some embodiments.

FIG. 3 is a simplified diagram of a method for training and use of a machine learning model for identification of business process automation opportunities according to some embodiments. In flowchart 200, preprocessing of event logs having desktop events and other user actions occurs at step 302. Preprocessing of event logs may include loading win-32 event logs of user actions from an automation finder database, such as a database in communication with server 120 having JSON files for user event logs of desktop actions. Fields within the event logs may be extracted and stored in a database associated with automation finder engine 130. In some embodiments, in flowchart 200, initial low-level events are input as training data for training the machine learning model so that it can identify and predict business process automation opportunities for significant sequences based on their ROI. This training data can include desktop computing input, events, comments, etc. relating to any desktop activity of a user within and using an application at a time. In some embodiments, the training data can be developed from a raw input dataset obtained from desktop events that are monitored, collected, and provided in the database, which may be over a specific period of time, and processed into a data set (e.g., in table form) for training the machine learning model. Examples of this data are shown in FIGS. 5A-C.

Low-level events are converted to natural text, for example, by removing unnatural text, such as computer programming and code, and/or converting the data to a format processable by automation finder engine 130. A sample data format of a desktop event and correspond user action is shown in FIG. 5A. For example, user action 500a includes multiple data components that may be preprocessed prior to being combined with other user actions to identify user action sentences, and then sequences repeated within those sentences. In some embodiments, each user action includes at least a type 502 corresponding to the type of input and a name 504 for the type of input. As shown in FIG. 5A, type 502 may be a "click" and name 504 for type 502 includes "LeftClick" to more specifically name type 502. User action 500*a* further includes an action time 506 that may be used for correlating user action 500*a* with other user actions and thereby forming sentences of user actions by and detecting sequences within those sentences, as discussed herein. User action 500*a* includes a position 508 within a window, interface, or GUI that specified where user action 500*a* occurs, as well as an active window 510 and an action component 512. Active window 510 and action component 512 further inform automation finder engine 130 of the business functionality of user action 500*a*.

Further, each user action, such as user action 500*a*, is further associated with a "description" field that summarizes the action's information. This field acts as a unique identifier of the user action's functionality. This allows different actions to be associated with different descriptions while the same actions can be linked by the same or similar identifiers (e.g., the same or similar descriptions and identifiers within a vector space or other representation). In an exemplary embodiment, a description for user action 500*a* may be as follows: "description": "User Click(LeftClick) on All applicationsFavoritesYour history(tab) in ABCD12345671 ServicePlease—Internet Explorer—iexplore". Other descriptions and/or identifiers may be used instead.

During step 220 of preprocessing event logs, an additional preliminary step may split an input stream of user actions into "sentences" of user actions, or other user actions that are temporally linked so that the sentence describes a particular business functionality and/or process. For example, each sentence is taken from an input stream based on a time frame or period in which the user actions of the sentence occur. An exemplary conversion of a string of user actions split into sentences based on temporal similarity is shown in FIG. 5B. Input stream 500*b* is initially shown as an unedited string 520 that includes a string of user actions as they occur but provides no temporal logic to the string. Each of "a," "b," "c," "d," and "e" may correspond to a user action (e.g., similar to user action 500*a*). Thus, the string displays an order of inputs. In contrast to unedited string 520, user action sentences 522 splits unedited string 520 into separate user action sentences, such as a sentence 524, that shows a string of five related user actions based on time. These five user actions (e.g., "a-b-c-d-e" for sentence 524) may occur in rapid succession such that the ones of the five user actions are temporally related based on a time difference between the user actions and/or a time frame in which the user actions occur.

In order to determine user action sentences 522, a time difference between subsequent user actions may be utilized, such that a high time difference between subsequent user actions implies that a user transitioned to another business functionality (e.g., execute a new different business process or repeated the previous business process). Thus, this may denote ending and beginning of a separate process. The time difference may be set by the system or an administrator, or learned based on time differences (e.g., analyzing differences between action time 506 and another time) in the specific user event log input and/or across all event logs. Additionally, the time difference may also be used with a specific time period or frame in which all input and desktop events are required to be detected so that sentences that are too long may be omitted. During the preprocessing step, the actions from the database may be processed and sentences may be identified by iterating the actions over the database of event logs. Actions may be identified separately so that each action may be identified with other actions occurring in temporal frequency and similarity to generate the particular user action sentences.

In order to train the machine learning model, grammar fixing and entity extraction may be performed to identify events embeddings that may be filtered for identification of business processes. At step 304, generalization of event descriptors may be performed such that noise within the description field (e.g., the field having the identifier that describes the user action's functionality) is reduced. For example, the description field may be noisy due to particular data that varies between user actions based on the input. Thus, even though the user action corresponds to the same functionality, a description may be different based on the local data input. In this regard, the local data input may be identified as variable input tokens, such as tokens that may include names, addresses, IP numbers, and other information that is particular to the certain input during a user action (e.g., a name added in a copy-paste user action). However, that user action (e.g., the copy-paste) may correspond to the same functionality and only have different dynamic input data.

For example, the following two descriptions of communications represent the same functionality of inserting text in a communicators conversation:

"User InputText on ISRAEL ISRAELI|conversation in communicator"

"User InputText on ISRAEL RANANA|conversation in communicator"

The descriptions above appear different, however, as they include different tokens for a NAME (e.g., "ISRAEL ISRAELI" and "ISRAEL RANANA"). In order to determine that these user actions correspond to the same user action, the unique token used individually for a "NAME" is replaced with more generalized descriptors of "NAME" so that the descriptions do not lose their identity and correspond to the same user action. In the above example, both would be replaced with: "User InputText on NAME I conversation in communicator". This improves further processing efficiency to identify most important or significant business processes based on ROI by ensuring that user actions having the same functionality are represented in an identical manner even if their particular token data is different (e.g., due to different input of dynamic data for the action even when the business functionality of the action is the same). Other tokens in the description field may also be replaced depending on the particular dynamic data for the user action. The actions may be generalized by iterating a generalization process over the database of user actions and removing particular names and other tokens.

Once generalization of event descriptors and other tokens are replaced, event sequences may be mined, at step 306. Mining of the sentences occurs to find repetitive sequences, such as two or more user actions performed in sequence, which reoccur within the user action sentences. In sequential pattern mining, repetitive sequence in a data set that contains sets of sequences may be identified.

In order to perform mining of sequences from the user action sentences, the PrefixSpan algorithm may be utilized for sequential data mining. The PrefixSpan algorithm determines sequential patterns in data, such as sequential user actions in user action sentences, through a pattern growth method. The PrefixSpan algorithm may identify repetitive sequences having a minimum sequence support, and that minimum support may be tuned to determine particular sequences based on the data set itself. Additionally, a maximum support value may also be set and/or tuned using the data. When using the PrefixSpan algorithm, a sequence database may be converted into a smaller set of data and sequential patterns may be identified by analyzing locally frequent fragments within the data sets. Thus, the PrefixSpan algorithm may be used to find candidate sequences first and then recursively passing those candidate sequences through the data of user actions and desktop events to identify all sequences within the database.

The PrefixSpan algorithm is discussed in more detail in *Mining sequential patterns by pattern-growth: the prefixspan approach*, Pei J, Han J, Mortazavi-Asl B, IEEE Transactions On Knowledge and Date Engineering, 2004, 16(11): 1424-1440, *Analysis of Web Access Sequence Based on the Improved PrefixSpan Algorithm*, Yang Xul and Yu Wang, International Industrial Informatics and Computer Engineering Conference (IIICEC 2015), and *Mining Sequential Patterns Using I-PrefixSpan*, Dhany Saputra, Dayang R. A. Rambli, Oi Mean Foong, *World Academy of Science, Engineering and Technology* 35 2007. However, other types of sequential data mining patterns may also be utilized including the GSP algorithm, SPADE algorithm, FreeSpan, or another algorithm.

Figure 4A:
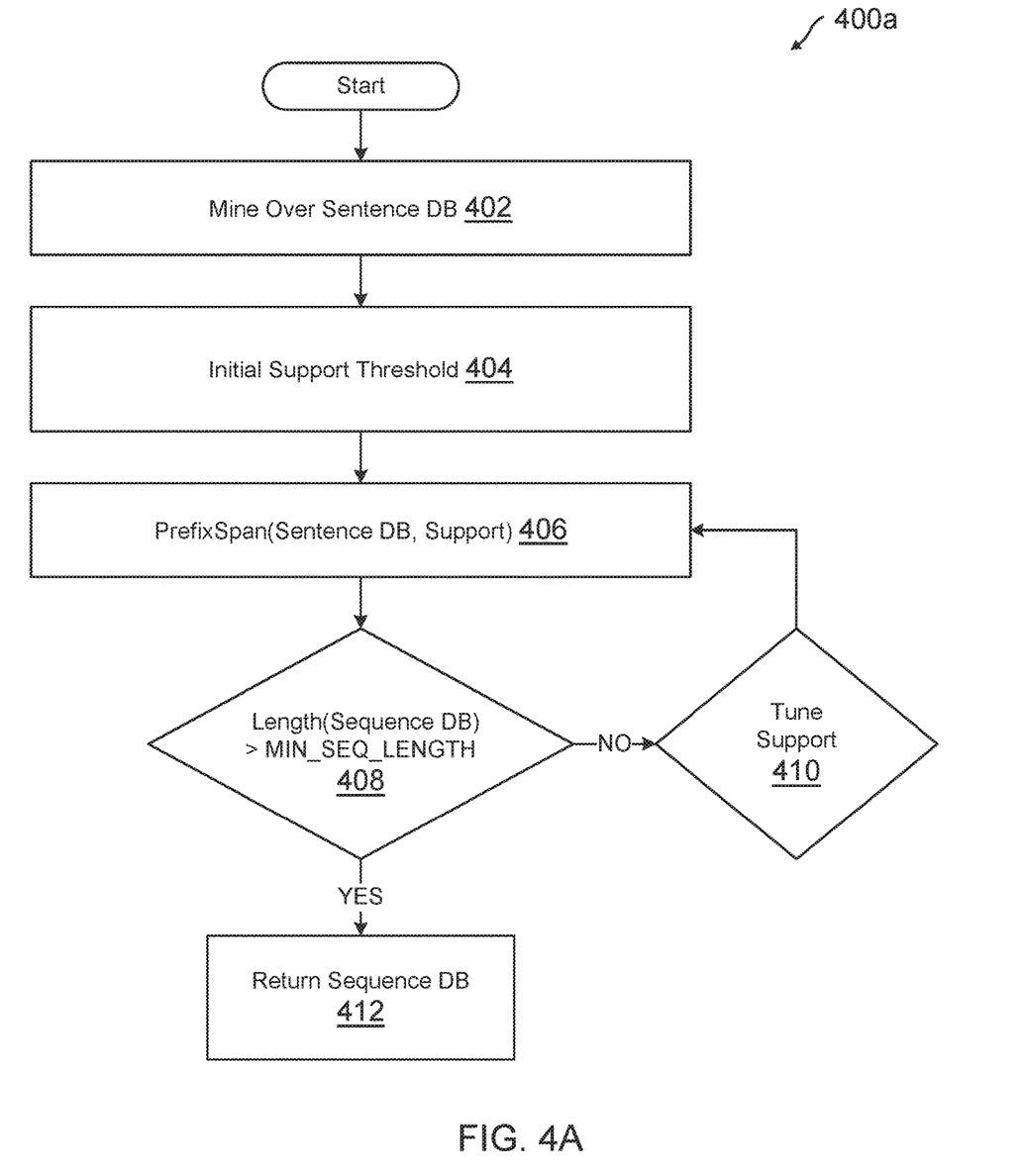
FIGS. 4A-4B is a simplified diagram of a method for mining and filtering of sequences of events to identify business process automation opportunities according to some embodiments.

An exemplary flowchart for sequence mining from data sets of user actions sentences is shown in FIG. 4A. In flowchart 400a, sequence mining from a sentence database begins at step 402. The sentence database includes the sentences of user actions broken up from a stream of data from an event log of desktop events. At step 404, a length for sequences is set having a threshold length that is used for identification of initial sequences based on their support within the user action sentences. The length may be utilized so that sequences of only a meaningful length are determined and identified in the user action sentences, and commonly repeating actions that do not define a business functionality are not utilized. Additionally, a support level and thresholds of support (e.g., the numerical count of the recurrence of a sequence in the event log) may be identified to further restrict sequence identification and mining. The support value may be tuned so that when identifying the support for sequences within the minimum and/or maximum length, a number of sequences that are identified may be increased or decreased based on their support level. This may increase or decrease the size of a sequences data set by providing more or less sequences for analysis in the resulting data set. Thus, when determining a sequence data set from processing a sentence data set based on the initial minimum support for those sequences within the sentence data set, dynamically tuning the support may allow for manipulation of a size of the resulting sequence data set so that only meaningful sequences may be identified and used for automation.

Using the PrefixSpan or other sequential pattern mining algorithm on the sentences, at step 406, the sequences are identified and returned in a sequences database. At step 408, it is determined whether the sequence database meets the minimum sequence length or size. For example, in FIG. 5B, user action sentences 522 may be used to identify b-c and b-c-c as sequences within user actions sentences. A minimum sequence threshold may be utilized to omit smaller recurring individual user actions of sequences and less likely sequences, which may be further tuned based on the needs of the system and/or administrator. For example, only sequence 526 may be required or desired in certain embodiments that has a minimum sequence recurrence of 3. As shown in FIG. 5B, b-c repeats 3 times (e.g., has a support of 3) while b-c-c has a support for 2. However, b-c-c may also be meaningful in some embodiments and desirable to be identified. Based on these support values and the minimum threshold support value, one or more of b-c and b-c-c may be omitted from and/or added to the sequence database based on tuning the support amount and the sequence length requirement for the sequence database. Thus, the minimum support threshold may be tuned in order to increase or decrease the size of the resulting sequence database to find only the most significant sequences for business process automation. By "most significant," this means relative to other sequences that have a lower ROI. The term most significant can also refer to a pre-selected number or percentage of sequences that a user or enterprise wants to consider.

At step 408, if it is determined that the sequence database does not meet the minimum amount of number of sequences, then the support threshold may be tuned at step 410. Tuning the support threshold may include raising or lowering the support threshold based on whether lowering the support threshold causes the length of the sequence database to meet a particular sequence database size required by the system. For example, by lowering the support threshold, additional sequences may be identified but may cause the sequence database to exceed a set length or number of sequences. Increasing the threshold may further restrict sequences from the database but may cause the database to fail to meet a minimum length or number of sequences. This value may be tuned until the value falls within a range or amount required by the system. However, if the length of the sequence database does meet the minimum required size (e.g., has sufficiently identified sequences for business process automation), then the sequence database may be returned at step 412.

Referring back to FIG. 3, at step 308, event sequences are filtered for significance of automation. Step 308 may be performed to identify those sequences that have the highest ROI and/or significance for automation so that those sequences may be automated through a script, template, and/or robotic process. During the filtering at step 308, those sequences identified at step 306 (and in the sequence database) may be filtered down to the most significant or best based on ROI of automating the sequences and corresponding business processes. This may be performed through multiple sub-steps shown in an exemplary process of FIG. 4B. For example, FIG. 4B includes a flowchart 400b of an exemplary process to perform sequence filtering on a resulting database of identified sequences meeting a minimum threshold value of support. In a first step 420, sequence filtering is implemented on the sequence database by iterating a scoring algorithm on the sequence database, at step 422.

Figure 4B:
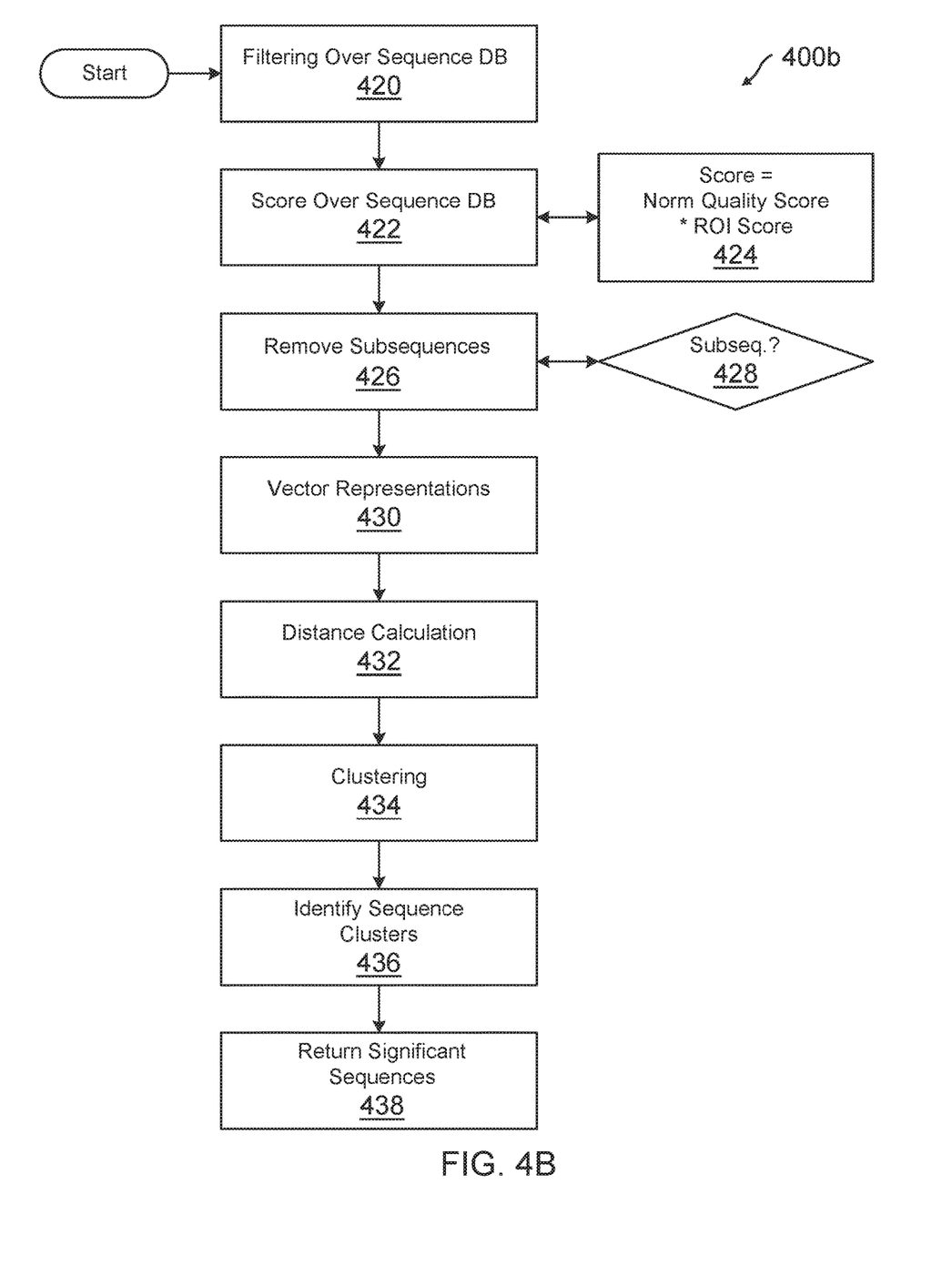

The scoring algorithm is shown at step 424 that scores each sequence, where the scoring algorithm is iterated over the sequences to determine a score for each sequence. The score for each sequence is calculated as score=norm_quality_score·ROI_score. In this regard, two rankings are weighted together to determine the score, which includes an ROI score and a quality score of the sequence. The ROI score corresponds to an amount of time that was spent on the sequence, such as a time from a starting timestamp of the first user action to a timestamp of the end user action and/or last data entry in the sequence. Thus, the ROI score identifies how much time was spent on the sequence and how much time can be saved by automating the sequence. The quality score represents a measure of the quality of the sequences actions. The quality of the sequences actions may associate a unique factor or value to each user action in the sequence based on the importance of the user action. For example, text input and/or copy-paste are more meaningful than a mouse-click or other action with no text. In some embodiments, this score may be normalized to a value between 1 and 1.5 (or any other value) so that the ROI score may be affected by a factor of up to 50% (or other amount, including devaluing the ROI score) based on the sequence's quality of actions.

At step 426, sequence filtering further includes sub-sequence removal to remove those sequences contained within a longer sequence and having a lower score than the longer sequence. For example, sub-sequence removal may proceed by filtering the sequences that are contained within a different sequence so that the higher scored sequences will be preferred. For example, consider a sequence having a-b-a-b-a-b of user actions in a sentence. Within that sequence, a-b (and others, such as a-b-a and b-a-b) may be found. However, a-b-a-b-a-b may have a higher score than a sequence of a-b (e.g., 10 vs. 5 after their scores are calculated using the aforementioned algorithm). Thus, the longer sequence may be preferred and be considered more significant for automation. Those sub-sequences are identified using the aforementioned process, at step 428. If such sequences exist, those sub-sequences are removed based on their score and the score of any parent sequences. Thus, when considering whether a sequence is significant for automation, or more significant than another sequence, the processes described herein may consider the sequence's ROI based on time for input and execution of the sequence by a user with additional factors. This scoring of sequences allows identification of a sequence's importance and significance, and further allows a quantitative measurement to be determined that allows comparison of sequences within a log of desktop events.

Clustering of sequences may further be performed to identify the same or similar sequences and select a sequence of those for automation. In this regard, sequence descriptions are converted to vector representation of the user actions, at step 430. Actions may be represented as vectors using word2vec or other technique to generate word vectors from user actions. For example, a vectorization process may generate a vector from word and/or text input of the user action. Each description and/or parts of the description can be a vector. In some embodiments, word vectors for actions may be attained by running methods like word2vec, Fast-Text, or GloVe, each of which defines a way of learning word vectors with useful properties. In some embodiments, pre-trained vectors of a certain dimensionality may be used. In some embodiments, the embedding may include partial vectors related to portions of a word within the actions. For example, the word "where" includes portions "wh," "whe," "her," "ere," and "re." Partial word embeddings can help to enrich word vectors with sub-word information. A vector representation of each sequence's description may then be generated through averaging the vectors of the descriptions included in the sequence.

At step 432, distance calculations are performed on sequences such that a distance between two sequences can be determined by weighing the Euclidean distance between vector representations of the two sequences with the Jaccard similarity between the two sequences. For example, a distance between sequence $S_1$ and sequence $S_2$ may be calculated as:

$$sdist(S_1, S_2) = p_1 \cdot |S_1 - S_2| + p_2 \cdot \frac{S_1 \cap S_2}{S_1 \cup S_2}$$

At step 434, using the distance between the sequences, clustering is performed to identify sequences with other similar sequences. A cluster represent sequences having similar business functionalities, such as sequences that implement the same or similar business processes for automation. When performing clustering, the following algorithm may be used to determine a modularity Q of a graph of those clusters within vector space:

$$Q = \frac{1}{M} \sum \left[ dist(S_i, S_j) - \frac{k_i k_j}{M} \right] \cdot \delta(c_i, c_j)$$

This may be defined as a value between −1 and 1 and represent the density of the links within the individual clusters versus the links between the clusters. In the aforementioned formula, $k_i$ represents the sum of the distances for the i-th sequence to the rest of the sequences, $c_i$ is the cluster associated with the i-th sequence, and M is the sum of $k_i$ (i.e., $M = \Sigma k_i$). Using this method, at step 436, an iterative finding of smaller clusters may be performed, wherein in each iteration, each sequence is associated with its cluster. Then for the sequence, the change in modularity is determined from its cluster. After determining the modularity for a sequence with its cluster, the sequence is then removed from the cluster and is associated with the cluster for its neighbor sequences. Iterating this over a database, the i-th sequence is associated with a cluster that maximizes the modularity.

Once clustering is performed, at step 438, the most significant sequences are returned. In each cluster, the sequence with the highest score is considered the most significant sequence and is returned for automation. The most significant sequences may then be named according to its actions. These significant sequences may then be analyzed for automation through scripts and templates allowing for dynamic data to be entered through one or more robotically automated processes.

For example, returning to FIG. 3, flowchart 300 ends with generating templates for dynamic data. Once the most significant sequences for automation are determined, templates for automation may be determined and utilized to build robotically automated business processes. For example, a template may correspond to a business flow or process where a user performs some initial desktop event, and then may perform multiple sub-events within that event to adjust the data initially provided in the event. An exemplary template is shown in FIG. 5C having static data and dynamic data entered to a static template. For example, an initial copy-paste of a template may be filled with multiple copy-pastes of dynamic data into portions of the template. Static template 540 includes information that may be entered into dynamic portion 542 through one or more copy-paste actions or another user input. A dynamic template 544 is shown having dynamic data 546 entered to dynamic portion 542. Dynamic data 544 may therefore fill static template 540 so that dynamic template 544 shows static data after entry of dynamic data 544. When determining if a template should be automated, the system may then determine if the sequence of the user actions meets the minimum support threshold (e.g., minimum template frequency in the event log of user actions.

As discussed above and further emphasized here, FIGS. 2, 3, 4A-B, and 5A-C are merely examples of an automation finder engine 130 and corresponding methods for training and use, which examples should not be used to unduly limit the scope of the claims. One of ordinary skill in the art would recognize many variations, alternatives, and modifications.

Some examples of computing devices, such as computing device 200, may include non-transitory, tangible, machine readable media that include executable code that when run by one or more processors (e.g., processor 210) may cause the one or more processors to perform the processes of method 300. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications of the foregoing disclosure. Thus, the scope of the present application should be limited only by the following claims, and it is appropriate that the claims be construed broadly and in a manner consistent with the scope of the embodiments disclosed herein.

What is claimed is:

1. A system for an artificial intelligence engine adapted to identify robotic process automation opportunities based on return on investment (ROI) potential for automation the system comprising:
   a processor and a computer readable medium operably coupled thereto, the computer readable medium comprising a plurality of instructions stored in association therewith that are accessible to, and executable by, the processor, to perform operations which comprise:
      receiving an event log of a plurality of user actions executed by a user via a computing device, wherein the event log comprises desktop events executed on an operating system via a computing desktop of the computing device;
      splitting the plurality of user actions into a plurality of user action sentences, wherein each of the plurality of user action sentences identifies a functionality executed by the user via the computing device in the plurality of user actions;
      determining a sequence of user actions in the plurality of user action sentences based on a recurrence for the sequence in the plurality of user action sentences, wherein the sequence comprises reoccurring user actions from the plurality of user actions recurring in the plurality of user action sentences, and wherein determining the sequence comprises:
         determining a plurality of sequences in the plurality of user action sentences based on a plurality of recurrences for the plurality of sequences in the plurality of user actions sentences, wherein the plurality of sequences includes the sequence, and determining that the recurrence of the sequence meets a minimum threshold for the artificial intelligence engine;
      determining a score for the sequence based on a time duration in which the user completes the sequence and based on types of the plurality of user actions in the sequence, wherein determining the score further comprises:
         determining scores of the plurality of sequences based on the time duration in which the user completes the plurality of sequences and based on the types of the plurality of user actions in the plurality of sequences;
      filtering the sequence with the plurality of sequences from the plurality of user actions based on the score and functionality of the sequence when executed by the user via the computing device, wherein filtering the sequence comprises:
         removing sub-sequences within the plurality of sequences based on the scores of the plurality of sequences,
         creating a plurality of vector representations for the plurality of sequences,
         determining a plurality of distances between the plurality of vector representations,
         clustering the plurality of vector representations based on the plurality of distances, and
         identifying at least one significant sequence based on the clustering the plurality of vector representations and the scores of the plurality of sequences; and
      generating a robotic process automation of the at least one significant sequence for at least a portion of the desktop events, wherein the robotic process automation is executable to perform the desktop events of the at least one significant sequence automatically on one or more computing devices associated with the operating system.

2. The system of claim 1, wherein the desktop events are detected by the computing device during use of at least one application accessible via the computing desktop on the computing device.

3. The system of claim 1, wherein prior to determining that the recurrence of the sequence meets the minimum threshold, the operations further comprise:
   identifying each of the plurality of sequences; and
   determining numerical support for each of the plurality of recurrences of the plurality of sequences in the plurality of user action sentences.

4. The system of claim 1, wherein generating the robotic process automation comprises generating at least one executable script for the at least one significant sequence based on the plurality of user actions in the at least one significant sequence in response to identifying the at least one significant sequence for automation.

5. The system of claim 4, wherein each of the executable scripts comprises a template to execute the plurality of user actions in each of the executable scripts using dynamic data provided for addition to the template.

6. The system of claim 1, wherein the operations further comprise:
   identifying a textual template executed by the user via the computing device based on reoccurring sequences of filling dynamic texts in the plurality of user action sentences, wherein the sequence comprises reoccurring user actions from the plurality of user actions recurring in the plurality of user action sentences.

7. The system of claim 1, wherein the at least one significant sequence comprises at least one process instance identified based on the clustering, and wherein the operations further comprise:

determining a number of appearances of the at least one process instance in the event log; and outputting the at least one process instance with the number of appearances.

8. The system of claim 1, wherein the operations further comprise:

selecting the sequence based on the recurrence and the minimum threshold, wherein the minimum threshold is dynamically adjusted based on a number of the user action sentences and a number of the plurality of sequences.

9. The system of claim 1, wherein prior to determining the sequence, the operations further comprise:

replacing identifying tokens within user actions of the plurality of user action sentences with a generalized descriptor.

10. The system of claim 1, wherein splitting the plurality of user actions into the plurality of user action sentences comprises:

identifying a subset of the plurality of user actions based on a time differential between consecutive user actions of the plurality of user actions, wherein the time differential identifies moving between different functionalities executed by the user via the computing device.

11. A method for execution by an artificial intelligence engine for identifying robotic process automation opportunities based on return on investment (ROI) potential for automation, which method comprises:

receiving an event log of a plurality of user actions executed by a user via a computing device, wherein the event log comprises desktop events executed on an operating system via a computing desktop of the operating system;

splitting the plurality of user actions into a plurality of user action sentences, wherein each of the plurality of user action sentences identifies a functionality executed by the user via the computing device in the plurality of user actions;

determining a sequence of user actions in the plurality of user action sentences based on a recurrence for the sequence in the plurality of user action sentences, wherein the sequence comprises reoccurring user actions from the plurality of user actions recurring in the plurality of user action sentences, and wherein determining the sequence comprises:

determining a plurality of sequences in the plurality of user action sentences based on a plurality of recurrences for the plurality of sequences in the plurality of user actions sentences, wherein the plurality of sequences includes the sequence, and determining that the recurrence of the sequence meets a minimum threshold for the artificial intelligence engine;

determining a score for the sequence based on a time duration in which the user completes the sequence and based on types of the plurality of user actions in the sequence, wherein determining the score further comprises:

determining scores of the plurality of sequences based on the time duration in which the user completes the plurality of sequences and based on the types of the plurality of user actions in the plurality of sequences;

filtering the sequence with the plurality of sequences from the plurality of user actions based on the score and functionality of the sequence when executed by the user via the computing device, wherein filtering the sequence comprises:

removing sub-sequences within the plurality of sequences based on the scores of the plurality of sequences, creating a plurality of vector representations for the plurality of sequences, determining a plurality of distances between the plurality of vector representations, clustering the plurality of vector representations based on the plurality of distances, and identifying at least one significant sequence based on the clustering the plurality of vector representations and the scores of the plurality of sequences; and generating a robotic process automation of the at least one significant sequence for at least a portion of the desktop events, wherein the robotic process automation is executable to perform the desktop events of the at least one significant sequence automatically on one or more computing devices utilizing the operating system.

12. The method of claim 11, wherein generating the robotic process automation comprises generating at least one executable script for the at least one significant sequence based on the plurality of user actions in the at least one significant sequence in response to identifying the at least one significant sequence for automation.

13. The method of claim 11, further comprising:

identifying a textual template for the user based on reoccurring sequences of filling dynamic text in user actions of the at least one significant sequence.

14. A non-transitory computer-readable medium having stored thereon computer-readable instructions executable to cause an artificial intelligence engine for identifying robotic process automation opportunities based on return on investment (ROI) potential for automation to perform operations which comprises:

receiving an event log of a plurality of user actions executed by a user via a computing device, wherein the event log comprises desktop events executed on an operating system via a computing desktop of the operating system;

splitting the plurality of user actions into a plurality of user action sentences, wherein each of the plurality of user action sentences identifies a functionality executed by the user via the computing device in the plurality of user actions;

determining a sequence of user actions in the plurality of user action sentences based on a recurrence for the sequence in the plurality of user action sentences, wherein the sequence comprises reoccurring user actions from the plurality of user actions recurring in the plurality of user action sentences, and wherein determining the sequence comprises:

determining a plurality of sequences in the plurality of user action sentences based on a plurality of recurrences for the plurality of sequences in the plurality of user actions sentences, wherein the plurality of sequences includes the sequence, and determining that the recurrence of the sequence meets a minimum threshold for the artificial intelligence engine;

determining a score for the sequence based on a time duration in which the user completes the sequence and based on types of the plurality of user actions in the sequence, wherein determining the score further comprises:

determining scores of the plurality of sequences based on the time duration in which the user completes the plurality of sequences and based on the types of the plurality of user actions in the plurality of sequences;

filtering the sequence with the plurality of sequences from the plurality of user actions based on the score and functionality of the sequence when executed by the user via the computing device, wherein filtering the sequence comprises:

removing sub-sequences within the plurality of sequences based on the scores of the plurality of sequences, creating a plurality of vector representations for the plurality of sequences, determining a plurality of distances between the plurality of vector representations, clustering the plurality of vector representations based on the plurality of distances, and identifying at least one significant sequence based on the clustering the plurality of vector representations and the scores of the plurality of sequences; and generating a robotic process automation of the at least one significant sequence for at least a portion of the desktop events, wherein the robotic process automation is executable to perform the desktop events of the at least one significant sequence automatically on one or more computing devices utilizing the operating system.

* * * * *